Figure 1:
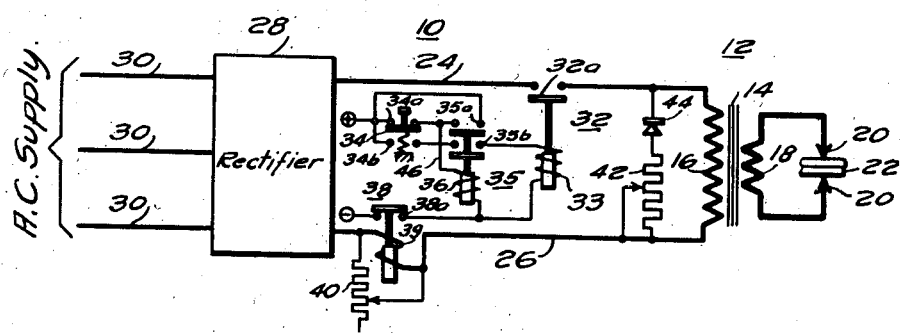

Nov. 3, 1942.　　　　　E. H. VEDDER　　　　　2,300,474
WELDING SYSTEM
Filed Nov. 27, 1940

WITNESSES:

INVENTOR
Edwin H. Vedder.
BY
ATTORNEY

Patented Nov. 3, 1942

2,300,474

UNITED STATES PATENT OFFICE 2,300,474

WELDING SYSTEM

Edwin H. Vedder, Forest Hills, Pa., assignor to Westinghouse Electric & Manufacturing Company, East Pittsburgh, Pa., a corporation of Pennsylvania Application November 27, 1940, Serial No. 367,354

3 Claims. (Cl. 219—4)

My invention relates, generally, to welding systems, and has reference, in particular to resistance welding systems of the stored energy type suitable for performing spot welding operations and the like.

Generally stated, it is an object of my invention to provide in a simple and effective manner for improving the performance of stored energy resistance welding systems.

More specifically, it is an object of my invention to provide for effecting more consistent operation of the primary switch in a transformer type stored energy welding system by utilizing a unidirectional current discharge circuit having predetermined characteristics for controlling the voltage induced in the primary winding thereof during a welding operation.

Another object of my invention is to provide for controlling the wave fronts of the current and voltage in a stored energy welder of the transformer type.

Yet another object of my invention is to provide for controlling the induced voltage applied to the primary switch in a transformer type of stored energy welder upon opening, so as to permit consistent operation of the switch to accurately interrupt the primary current in accordance with predetermined conditions.

Still another object of my invention is to provide for controlling the voltage induced in the primary winding of a transformer type of stored energy welder during a welding operation without effecting a loss of energy during the charging period.

Other objects of my invention will, in part, be obvious, and will, in part, appear hereinafter.

Instead of utilizing a plurality of sequentially operable switches and resistors for effecting a more or less gradual interruption of the primary circuit of a transformer type of stored energy welder by inserting increasing values of resistance in series with the primary winding, as was customary in the prior art, in practicing my invention, an adjustable control resistor may be connected in shunt circuit relation with the primary winding of a transformer type of stored energy welder between the transformer primary and the switch controlling the connection thereof to a suitable source of direct current to provide a variable discharge circuit therefor. A rectifier may be connected in series circuit relation therewith so as to block the flow of current through the control resistor while the primary winding of the transformer is connected to the direct-current source for charging the transformer with electromagnetic energy, and provide a fixed discharge circuit having predetermined characteristics, which becomes effective immediately upon a discharge of the transformer during the welding period, when it is disconnected from the direct-current source. In this manner, the welding current and voltage wave fronts may be controlled or pre-selected with certainty, and it is possible to prevent excessive voltages from being produced across the switch terminals when it is opened to disconnect the primary winding of the transformer from the source. More consistent operation of the switch may thereby be secured, resulting in better welds and an increase in the operating life of the switch.

Figure 2:
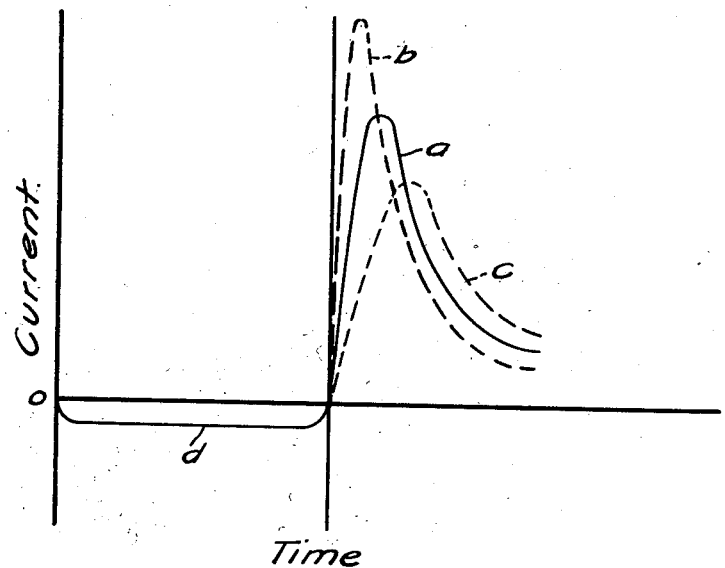

For a more complete understanding of the nature and scope of my invention, reference may be had to the following detailed description, which may be taken in connection with the accompanying drawing, in which:

Figure 1 is a diagrammatic view of a welding system embodying the principal features of the invention; and Fig. 2 shows characteristic curves typical of the different welding current waves which may be secured in a welding system embodying my invention.

Referring to Figure 1 of the drawing, the reference numeral 10 may denote, generally, a spot welding system of the stored energy type. A welding transformer 12 may be provided having a magnetic core 14 of a suitable type with primary and secondary windings 16 and 18, respectively, thereon. The secondary winding 18 may be connected to a welding circuit, including relatively movable electrodes 20 adapted to engage the work 22 which is to be welded. The primary winding 16 of the welding transformer may be connected by means of the conductors 24 and 26, to a suitable source of direct current, such as for example, the rectifier 28, which may be connected by means of the conductors 30 to a source of alternating current.

In order to control the energization of the primary winding 16 and produce in the core 14 a magnetic flux field which may be allowed to collapse and produce voltages in the secondary winding 18 to effect welding operations on the work 22, suitable switch means may be provided for controlling the connection of the primary winding 16 to the rectifier 28, such as for example, the electromagnetic switch device 32. The operating winding 33 of the switch device 32 may be connected to a suitable source of control voltage in any suitable manner, such as by means of a push button switch 34, and a control relay 35 having an operating winding 36 which may be so connected to the source of control voltage as to control the operations of the switch device 32 to connect the primary winding 16 to the rectifier 28 and initiate welding operations.

For the purpose of controlling the welding operations, suitable means may be provided for so controlling the switch device 32 as to effect the disconnection of the primary winding 16 from the rectifier 28 under predetermined conditions. For example, a current responsive relay 38 may be provided, having an operating winding 39 connected in series circuit relation with the primary winding 16, and normally closed contact members 38a connected in series circuit relation with the operating windings 33 and 36 of the switch device 32 and control relay 35, respectively. Suitable means may be provided for controlling the operation of the current responsive relay 38 so as to effect operations thereof at different predetermined values of current in the primary winding 16. An adjustable resistor 40 may be employed for this purpose and connected in shunt circuit relation with the operating winding 39 of the current responsive relay so as to vary the current therethrough and effect operation of the relay 38 at different predetermined values of primary current.

In order to limit the voltage induced in the primary winding 16 by the collapse of the magnetic flux field in the core 14 when the switch device 32 disconnects the primary winding from the rectifier 28, control the value and duration of the welding current, and secure more consistent operation of the switch device 32 in interrupting the primary current to effect a welding operation, suitable control means, such as the adjustable discharge resistor 42, may be provided. The resistor 42 may, for example, be connected in shunt circuit relation with the primary winding 16 between the primary winding and the switch device 32, so as to provide a relatively high impedance discharge path for the primary winding. The voltage induced in the primary winding 16 by the collapse of the flux in the core 14 may thus be controlled to secure any suitable value thereof and the secondary current and voltage may also be controlled thereby.

With a view to improving the efficiency of the welding system, means may be provided for preventing the flow of current through the discharge resistor 42 during the interval that the primary winding 16 is connected to the rectifier 28 for charging the core with electromagnetic energy. For this purpose, a suitable rectifier device 44 may be connected in series circuit relation with the discharge resistor 42, so as to prevent the flow of current therethrough from the rectifier 28, and permit a controlled flow of current therethrough from the primary winding 16 upon the disconnection of the primary winding from the rectifier by the opening of the switch device contacts 32a.

The welding system embodying my invention may operate in the following manner. The operating winding 36 of the relay 35 is normally energized, through the contact members 34a, conductor 46, operating winding 36, and contact members 38a. The contact members 35a provide a shunt holding circuit about the pushbutton contact members 34a. The electrodes 20 may be brought into contact with the work 22 in any suitable manner and the pushbutton switch 34 may then be operated to effect energization of the operating winding 33 of the switch device 32, through the circuit extending from the positive terminal of the control source through contact members 34b, contact members 35b, operating winding 33, and contact members 38a to the negative terminal. Upon operation of the switch device 32, the primary winding 16 of the transformer 12 is connected to the direct-current terminals of the rectifier 28 through contact members 32a, so that the core of the welding transformer is magnetized and a charge of electromagnetic energy stored therein. A relatively low pre-welding current is induced in the secondary winding and flows in the welding circuit during the charging period.

The current in the primary winding increases substantially exponentially, until, at a predetermined value thereof, as determined by the adjustment of the resistor 40, the current responsive relay 38 operates, opening contact members 38a and effecting deenergization of the operating winding 33 of the switch device 32 and the operating winding 36 of the control relay 35. The switch device 32 and the control relay 35 return to the deenergized position. The connection of the primary winding 16 to the rectifier 28 is interrupted and the magnetic flux field produced in the core 14 of the welding transformer collapses, inducing a voltage in the primary and secondary windings of the welding transformer, and performing a welding operation.

If the pushbutton 34 is held closed, the energizing circuit for the operating winding of the control relay 35 is interrupted by the open contact members 34a. If the pushbutton 34 is returned to the normal open position, the energizing circuit for the operating winding 33 of the switch device is interrupted at the contact members 34b. Thus single welding operations may be secured regardless of the position of the pushbutton switch 34, so that the system is independent of the operator in this respect and accidental repeat welds will not result.

In accordance with my invention, the discharge resistor 42 prevents the voltage induced in the primary winding 16, which would otherwise be open-circuited, from reaching an excessive value. The switch device 32 is not, therefore, required to interrupt any excessive voltage, and arcing-over of the switch contacts is thereby prevented. By adjusting the discharge resistor 42, the wave fronts of the welding current and voltage may be changed to suit the particular conditions of the individual welding operations.

Referring to Fig. 2, the curve a indicates a typical welding current wave produced by a normal setting of the control resistor 42. The curves b and c indicate typical high and low, or steep and relatively flat current waves produced by high and low values of the resistor 42, respectively. The curve d indicates a typical current wave produced in the welding circuit during charging. As the values of this current are but little affected by adjusting the control resistor 42, only a single curve thereof is shown. The time of discharge of the welding transformer, and the duration and value of the welding impulse, may be readily controlled by adjusting the resistor 42, as shown by the curves a, b, and c.

From the above description and the accompanying drawing, it will be apparent that by embodying the features of my invention in transformer welding systems of the stored energy type, the reliability of the welding apparatus may be greatly increased, since the characteristics of the discharge circuits are substantially constant and there are no moving contacts therein. Defective welds heretofore often resulting from failure or partial failure of the primary switch to properly interrupt the flow of primary current at the correct time, are therefore entirely eliminated. In addition, the value and duration of the welding current may be readily controlled to suit different conditions. The efficiency of the welding system is not effected, since the discharge resistor is rendered ineffective during the transformer charging period and no charging current is by-passed therethrough.

Since certain changes may be made in the above description, and different embodiments of the invention may be made without departing from the spirit thereof, it is intended that all matter contained in the above description or shown in the accompanying drawing, shall be considered as illustrative and not in a limiting sense.

I claim as my invention:

1. A welding system comprising, a transformer having a magnetic core with a secondary winding disposed to be connected to a welding circuit and a primary winding, switch means operable to control the connection of the primary winding to a source of direct current for storing electromagnetic energy in the core, relay means responsive to the current in the primary winding operable to effect operation of the switch means to disconnect the primary winding from the direct-current source and utilize the electromagnetic energy to produce a weld current in the welding circuit, a control impedance having predetermined characteristics connected in shunt relation with the primary winding between the switch means and said winding to predetermine the shape of the current wave in the welding circuit, and rectifier means connected in series circuit relation with the said impedance to limit the current therethrough from the source.

2. The combination with a stored energy welder having a magnetic core with primary and secondary windings, switch means operable to control the connection of the primary winding to a source of direct current, and means responsive to the current in the primary winding for effecting an operation of the switch means to disconnect the primary winding from the source, of an adjustable control resistor connected across the primary winding operable to predetermine the scope of the current wave in the secondary winding and unidirectional current means connected in series circuit relation with the control resistor to limit the current therethrough when the primary winding is connected to the source.

3. The combination with a stored energy welder having a transformer with primary and secondary windings and switch means for controlling the connection of the transformer primary winding to a source of direct current for charging with electromagnetic energy and its disconnection therefrom for discharging said energy to produce a secondary current to effect a weld, of an adjustable discharge impedance connected in the primary of the transformer for predetermining the peak value of the secondary weld current, and a rectifier connected to prevent the discharge impedance from bypassing the charging current.

EDWIN H. VEDDER.